United States Patent
Kikuchi (10) Patent No.: US 8,610,916 B2
(45) Date of Patent: Dec. 17, 2013

(54) IMAGE FORMING DEVICE, IMAGE FORMING METHOD AND STORAGE MEDIUM FOR TRACKING A USER, EVEN WHEN AN IMAGE IS PROHIBITED FROM BEING OUTPUT

(75) Inventor: Hiroshi Kikuchi, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 12/826,485

(22) Filed: Jun. 29, 2010

(65) Prior Publication Data

US 2011/0019220 A1    Jan. 27, 2011

(30) Foreign Application Priority Data

Jul. 21, 2009   (JP) .................................. 2009-170083

(51) Int. Cl.
*G06K 15/00*     (2006.01)

(52) U.S. Cl.
USPC ......... 358/1.14; 358/1.16; 358/3.28; 399/366

(58) Field of Classification Search
USPC ..................... 358/1.14, 1.16, 3.28; 399/366
See application file for complete search history.

(56) References Cited

U.S. PATENT DOCUMENTS

| | | | | |
|---|---|---|---|---|
| 7,593,857 B2* | 9/2009 | Mattern | ...................... | 705/14.53 |
| 8,023,127 B2* | 9/2011 | Matsunoshita | .............. | 358/1.14 |
| 2008/0100880 A1 | 5/2008 | Matsunoshita | | |
| 2008/0297825 A1* | 12/2008 | Hikichi | ......................... | 358/1.14 |
| 2009/0021765 A1* | 1/2009 | Takahashi | ..................... | 358/1.14 |
| 2009/0086267 A1* | 4/2009 | Sato | .............................. | 358/1.15 |
| 2009/0147292 A1* | 6/2009 | Shimura et al. | .............. | 358/1.14 |
| 2009/0268259 A1* | 10/2009 | Kikuchi | ........................ | 358/468 |

FOREIGN PATENT DOCUMENTS

| | | |
|---|---|---|
| JP | 2004-7814 | 1/2004 |
| JP | 2008118201 A | 5/2008 |

OTHER PUBLICATIONS

Japanese Office Action dated Aug. 20, 2013 issued during prosecution of related Japanese application No. 2009-170083.

* cited by examiner

*Primary Examiner* — Benny Q Tieu
*Assistant Examiner* — Quyen V Ngo
(74) *Attorney, Agent, or Firm* — Fitzpatrick, Cella, Harper & Scinto (57) ABSTRACT

Even when an image output is prohibited, an image forming device, an image forming method and a program are provided that can track an evidence of attempt to perform the image output. Output prohibition information and tracking information for tracking a user are acquired from an image of a scan document. The image output of the scan document is prohibited according to the acquired output prohibition information, and the acquired tracking information is stored as a log.

5 Claims, 7 Drawing Sheets

FIG.7

IMAGE FORMING DEVICE, IMAGE FORMING METHOD AND STORAGE MEDIUM FOR TRACKING A USER, EVEN WHEN AN IMAGE IS PROHIBITED FROM BEING OUTPUT

BACKGROUND OF THE INVENTION

1. Field of the Invention

The present invention relates to an image forming device, an image forming method and a storage medium.

2. Description of the Related Art

In Japanese Patent Laid-Open No. 2008-118201, there is disclosed a technology that detects a barcode from a document to be scanned (hereinafter referred to as a scan document) to prohibit the copying of the scan document. Japanese Patent Laid-Open No. 2008-118201 also discloses that, when the copying is prohibited, information indicating the prohibition of the copying is stored as a log in a device whereas, when the copying is permitted, information indicating the permission of the copying is stored as a log in the device. Moreover, when the copying is permitted, tracking information is acquired from the barcode on the scan document, and is stored as a log along with an image representing the scan document. Here, the tracking information refers to information that is acquired from the scan document, and that is used for identifying a person who, for example, scanned or printed the document to output the scan document.

According to Japanese Patent Laid-Open No. 2008-118201, however, when the copying is prohibited, the tracking information is not stored as a log. Thus, disadvantageously, when a prohibition document (a document that is prohibited from being copied) holding the tracking information is prohibited from being output as an image, for example, from being copied or printed, an organizer cannot track, from a log, an evidence of attempt to output the information as an image.

SUMMARY OF THE INVENTION

The present invention provides an image forming device, an image forming method and a storage medium that can track, even when an image is prohibited from being output, an evidence of attempt to output the image.

According to the present invention, there is provided an image forming device including: an acquisition unit configured to acquire, from an image of a scan document, output prohibition information indicating either prohibition or permission of an image output and tracking information for tracking a user who has output a document as the scan document; a prohibition unit configured to prohibit the image output of the scan document according to the acquired output prohibition information; and a log storage unit configured to store, as a log, information indicating that the image output of the scan document is prohibited by the prohibition unit and the acquired tracking information in association with each other.

According to the present invention, it is possible to provide an image forming device, an image forming method and a storage medium that can track an attempt to output the image, even when an image output is prohibited.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings. Constituent elements described in these embodiments are however simply examples; the scope of the present invention is not limited to these embodiments.

Example 1

Configuration of an Image Forming Device

Figure 1:
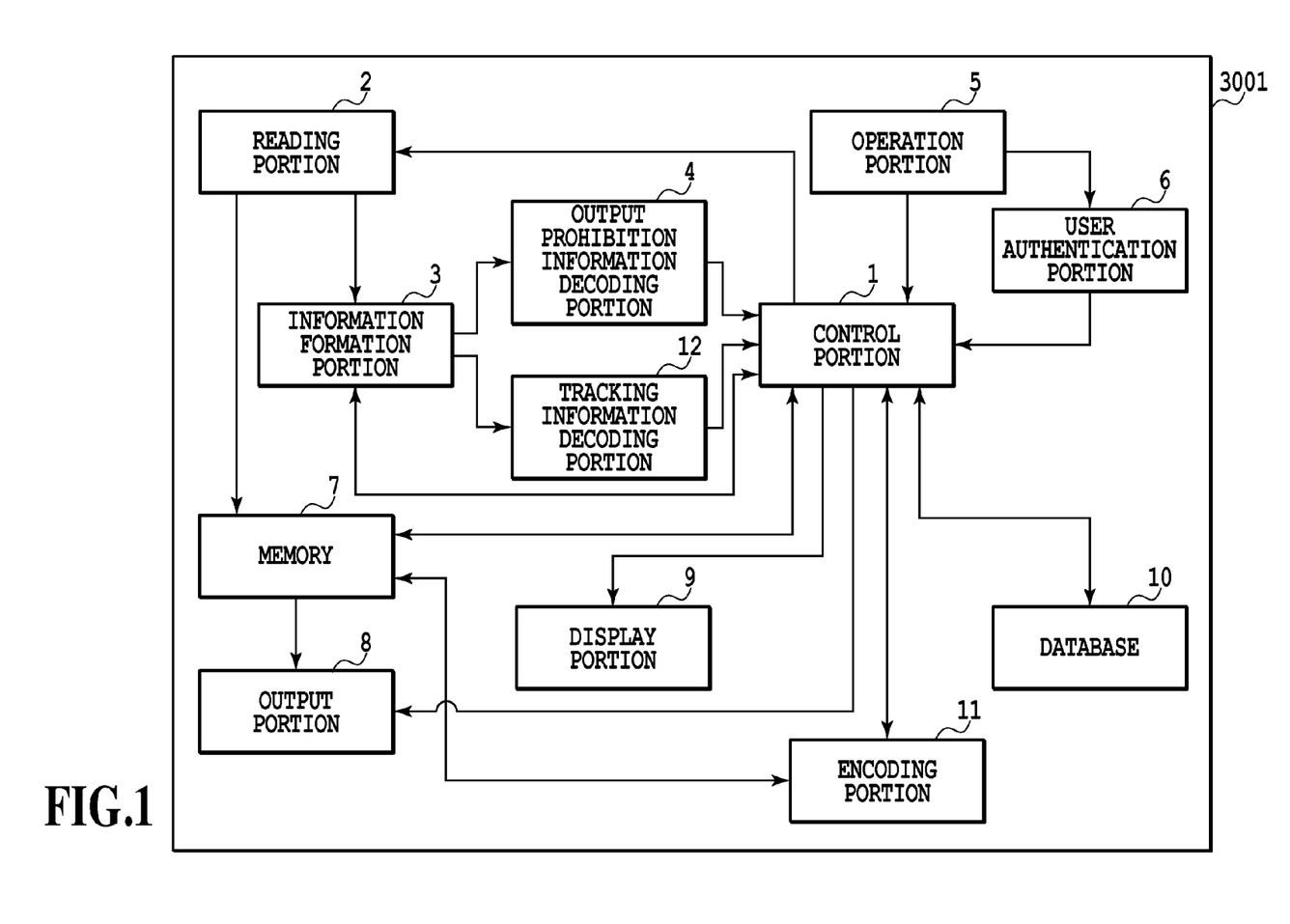
FIG. 1 is a block diagram of an MFP of a first example.

FIG. 1 is a block diagram showing the configuration of an MFP 3001 as an example of an image forming device of this example.

A control portion 1 controls individual portions of the MFP 3001. An operation portion 5 receives an operation/input from a user. A user authentication portion 6 organizes the user authentication of the user who uses the MFP 3001. A reading portion 2 scans a print document (a scan document) to generate document information. An information formation portion 3 forms information from a barcode included in the document information and thereby obtains embedded information. An output prohibition information decoding portion 4 decodes the embedded information obtained by the information formation portion 3, and thereby acquires output prohibition information. Here, the output prohibition information refers to information indicating whether the output of an image of the scan document through, for example, copying or scanning is prohibited or permitted. A tracking information decoding portion 12 decodes the embedded information obtained by the information formation portion 3, and thereby acquires tracking information. A description and a specific example of the tacking information will be described later.

A memory 7 stores the document information obtained by the scanning. An output portion 8 reads image information from the memory 7, and thereafter performs outputting such as the printing of the image information or the transmission of the image information to an external device. Here, the external device refers to, for example, a device such as a PC connected through a network to the MFP 3001. A display portion 9 displays a display screen by the control of the control portion 1. A database 10 is a recording portion that records the setting of the MFP 3001 and logs. An encoding portion 11 encodes the output prohibition information and the tracking information to generate embedded information. As described later, in the encoding, an error correction code is added, and the embedded information is generated. The encoding portion 11 creates an image of the embedded information thus generated to generate a barcode.

[Information Embedding Processing]

The flow of processing of individual blocks shown in FIG. 1 will be described. The user first inputs a user name (a user ID may be used instead)/password to the operation portion 5 while looking at a setting screen displayed on the display portion 9. The input information is fed from the operation portion 5 to the user authentication portion 6, and the user authentication portion 6 determines whether or not the input password is appropriate. If the password is determined to be appropriate, the result of the determination and the user name are notified to the control portion 1.

When the control portion 1 receives the notification, the control portion 1 displays on the display portion 9 a screen for setting whether or not to embed information. For example, the control portion 1 displays on the display portion 9 a checkbox of [embed information]. Then, the user checks the checkbox through the operation portion 5 (in other words, sets the information embedding) to provide an instruction to perform printing, and the operation portion 5 notifies the result to the control portion 1. The information embedding may be set through a driver or a utility of the PC connected to the MFP 3001. If an instruction to perform printing is provided without the checking of the checkbox, the operation portion 5 notifies the fact to the control portion 1.

Figure 2:
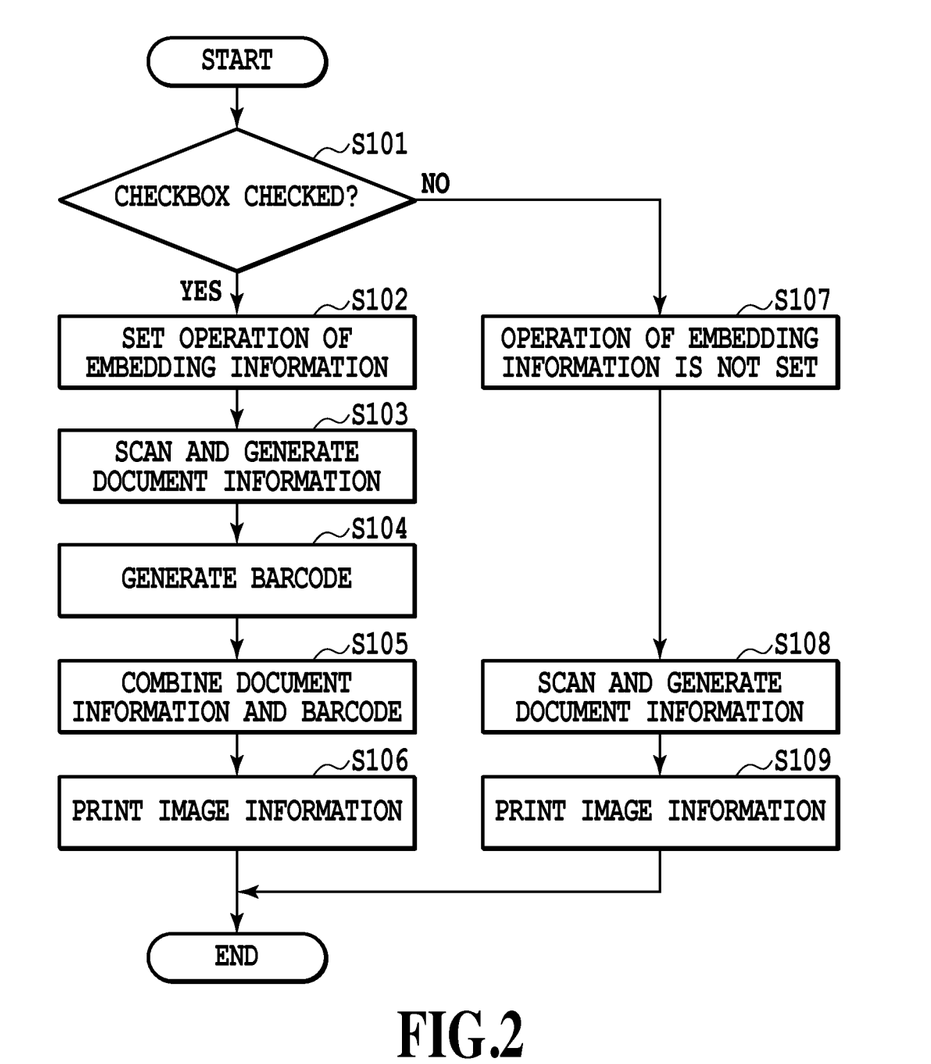
FIG. 2 is a diagram showing an outline of an operation of the MFP of the first example at the time of printing.

Thereafter, as shown in FIG. 2, in step S101, the control portion 1 determines, based on the notification received from the operation portion 5, whether or not the checkbox is checked. If it is checked, the process proceeds to step S102 whereas, if it is not checked, the process proceeds to step S107.

In step S102, the control portion 1 sets the operation of embedding the information, and notifies the result and the user name to the encoding portion 11. Then, the control portion 1 instructs the reading portion 2 to scan the scan document.

In step S103, the reading portion 2 scans the scan document to generate the document information, and transmits it to the memory 7 and the information formation portion 3.

In step S104, the encoding portion 11 encodes the output prohibition information and the tracking information (including the user name) to obtain the result of the encoding (the embedded information), and creates an image of the embedded information to generate the barcode. Thereafter, the encoding portion 11 transmits the generated barcode to the memory 7.

Thereafter, the control portion 1 detects that the memory 7 has received the barcode and the document information, and then the process proceeds to step S105 where they are combined together in the memory 7 to generate the image information.

Then, in step S106, the control portion 1 transmits the generated image information from the memory 7 to the output portion 8, and causes the output portion 8 to print it.

If the checkbox is not checked, in step S107, the control portion 1 does not set the operation of embedding the information, and instructs the reading portion 2 to scan the scan document.

In step S108, the reading portion 2 scans the scan document to generate the document information, and transmits it to the memory 7.

Thereafter, the control portion 1 detects that the memory 7 has received the document information, and then the process proceeds to step S109 where the control portion 1 transmits the generated document information as the image information from the memory 7 to the output portion 8, and causes the output portion 8 to print it.

The tracking information included in the embedded information includes information such as the printing time and date when the scan document was printed, the user name of the user who provided the instruction to perform the printing and a print ID (an ID assigned for each round of printing and unique to a system). Here, the tracking information is not limited as long as it is useful information for identifying the user who has performed the printing. For example, when a monitoring camera is installed in a place where the printing has been performed, it is possible to identify the user from the printing time and date included in the embedded information and pictures taken by the camera. Thus, the printing time and data can be one piece of information for identifying the user. In this specification, the tracking information is defined as information for identifying the user that is output as an image by, for example, scanning or printing the scan document.

Here, one example of a method of encoding the output prohibition information and the tracking information and creating an image of the result of the encoding will be described with reference to FIGS. 3 and 5.

Figure 5:
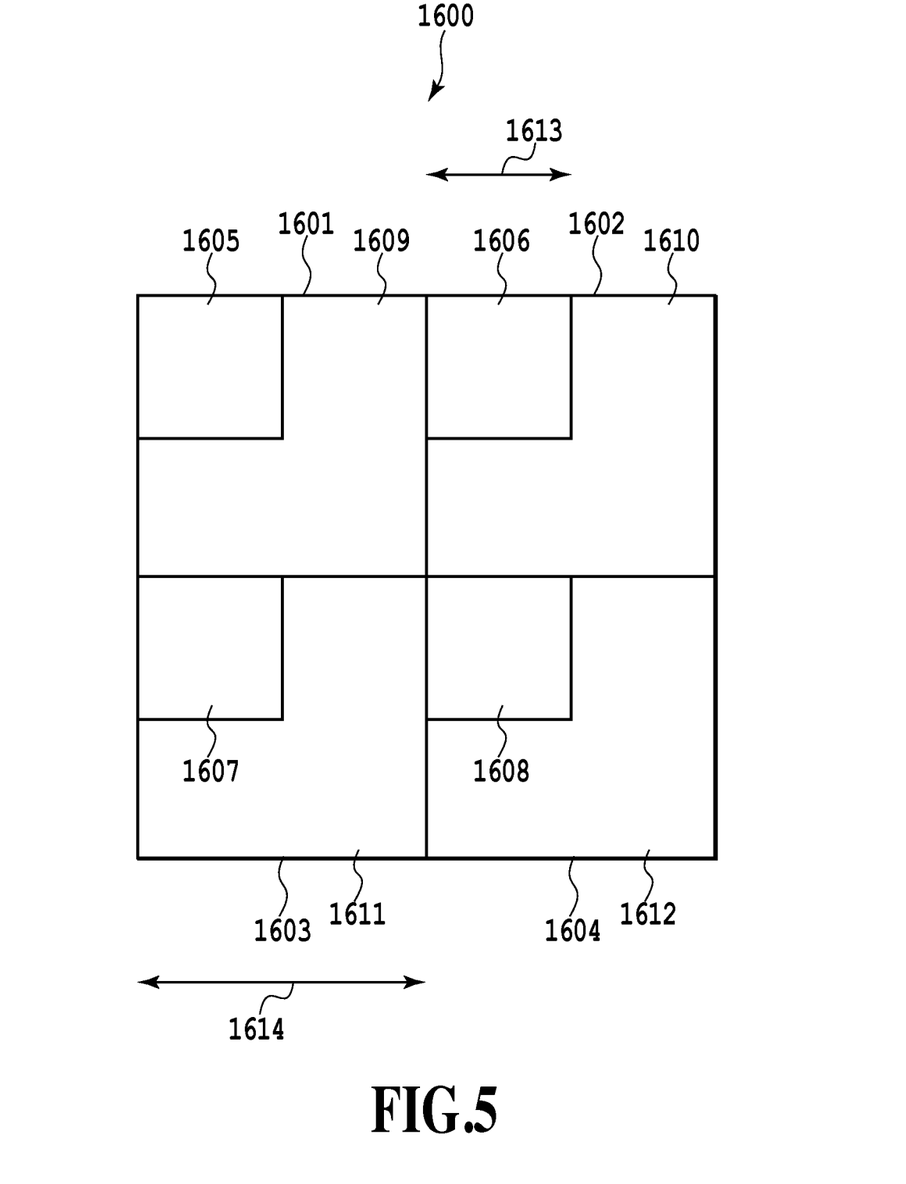
FIG. 5 is a diagram showing an example of the arrangement of regions where information is embedded.

FIG. 5 is a supplementary diagram used for explaining a unit barcode 1600. The unit barcode 1600 is about 1 cm by 1 cm, and is composed of high density regions (1605 to 1608) and low density regions (1609 to 1612). The high density regions include the result obtained by encoding the output prohibition information; the low density regions include the result obtained by encoding the tracking information.

In the high density regions, a large number of error correction codes are used as compared with the low density regions (this fact reflects the conception that the output prohibition information is more important than the tracking information). A large number of error correction codes are used but the regions including the output prohibition information are smaller; this is because the data size of the output prohibition information is smaller.

This unit barcode 1600 is repeatedly formed over the entire surface of the document information. For example, when the document information is printed on an M-size (21 cm by 29.7 cm) sheet, 21 by 29 unit barcodes are only formed over the document information. In this way, 609 pieces of information identical to each other are formed. In this specification, all unit barcodes (609 unit barcodes) formed over the document information or part of unit barcodes are referred to as a barcode.

Figure 3:
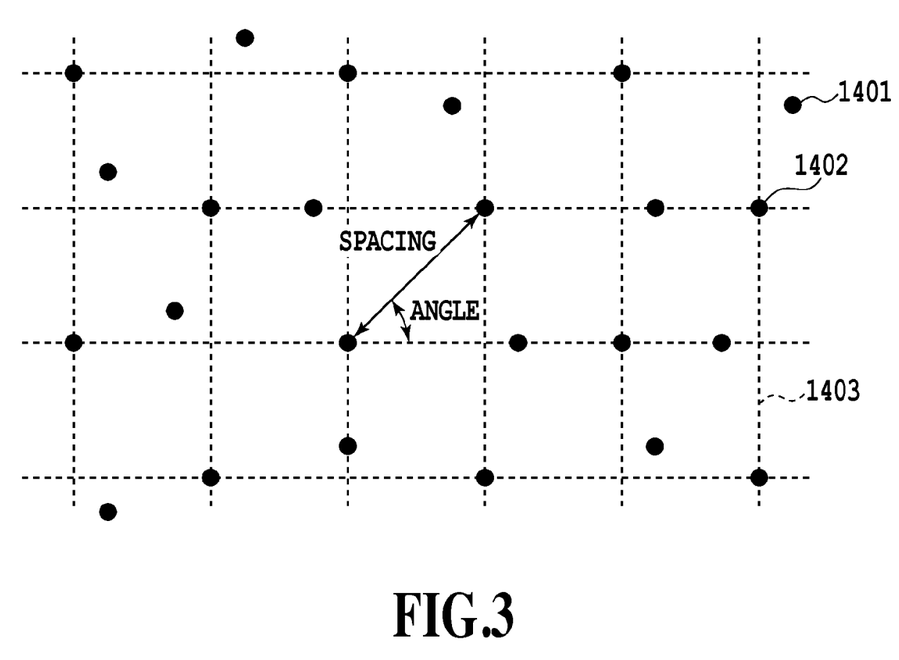
FIG. 3 is a supplementary diagram used for explaining a unit barcode.

FIG. 3 is a diagram showing what types of dots are included in each region 1605 shown in FIG. 5. In this region, information dots 1401 and arrangement dots 1402 are included. The arrangement dots 1402 are regularly spaced on reference grids 1403 represented by dotted lines (and are arranged at intersections of the reference grids 1403).

The information dots 1401 are positioned to be displaced from the intersections of the reference grids 1403.

The direction of this displacement (direction in which the position is displaced from the intersection) represents the result obtained by encoding the output prohibition information. In other words, the embedded information obtained by encoding the output prohibition information (or part of the embedded information, that is, the result obtained by encoding the output prohibition information) is imaged, and thus the unit barcode where the information dots 1401 and the arrangement dots 1402 are included in the region 1605 can be formed. In the other regions 1606 to 1608, the same dots obtained by imaging the same information in the same manner are included (in order to secure redundancy).

In the regions 1609 to 1612, dots obtained by imaging the embedded information (or part of the embedded information, that is, the result obtained by encoding the tracking information) are included; the imaging method is the same as in the regions 1605 to 1608.

In this specification, the following steps are collectively referred to as encoding: (i) forming the embedded information by encoding the output prohibition information and/or the tracking information; (ii) forming the unit barcodes by imaging this embedded information; and (iii) arranging the barcodes (for example, 609 barcodes) in vertical and horizontal directions. This encoding processing is performed by the encoding portion 11.

Although, in FIG. 3, the reference grid is represented by the dotted lines, it is actually imaginary lines that are not printed. Processing for finding these imaginary lines will be described with reference to FIG. 4. This processing is performed by the information formation portion 3.

Figure 4:
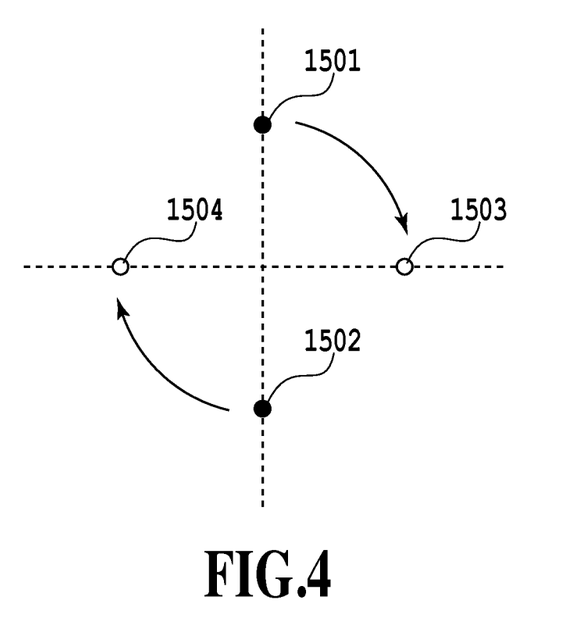
FIG. 4 is a diagram used for explaining a correction of the angle of rotation of a grid.

The information formation portion 3 arbitrarily selects a dot 1501. Then, the information formation portion 3 arbitrarily selects a dot 1502 that is present around the selected dot. Thereafter, the information formation portion 3 turns the positions of the selected dots by 90 degrees about the central point between the dots. If there are dots in the positions obtained by the turning, the dots selected as described above are determined, by the information formation portion 3, to be the arrangement dots that should exist at regular intervals in vertical and horizontal directions.

On the other hand, if there are no dots, the dots selected as described above are determined, by the information formation portion 3, to be the information dots that should exist at random positions. In this way, the information formation portion 3 finds two arrangement dots, and then finds all the other arrangement dots by utilizing the constraint condition that the arrangement dots exist at regular intervals in both vertical and horizontal directions.

After finding all the arrangement dots, the information formation portion 3 draws the reference grid on these arrangement dots in an imaginary manner, finally determines the direction in which the remaining dots (that is, the information dots) are displaced from the intersections of the reference grids, and obtains the embedded information.

In this specification, for example, when the dot is displaced in an upward direction, "0" is obtained; when the dot is displaced in an upper rightward direction, "1" is obtained; and when the dot is displaced in a rightward direction, "2" is obtained, as the embedded information.

[Copying Processing]

The flow of processing when the MFP 3001 performs copying will now be described with reference to FIG. 6. The control portion 1 reads a control program from a storage portion such as the memory 7 to execute the program, and thereby controls such processing.

The numeral 201 represents a repetition range between the numeral 201 and step S213.

In step S202, as in the processing in steps S103 and S108 of FIG. 2, the reading portion 2 scans the scan document. Then, the reading portion 2 generates the document information including the image of the scan document and transmits it to the memory 7.

Then, in step S203, the control portion 1 determines whether or not the barcode is detected from the document information obtained in step S202. If the barcode is detected, the process proceeds to step S204 whereas, if the barcode is not detected, the process proceeds to step S210.

In step S204, the control portion 1 uses the information formation portion 3 to acquire the embedded information from the barcode, and determines whether or not the output prohibition information is present therein. If the output prohibition information is present therein, the process proceeds to step S205 whereas, if it is not present, the process proceeds to step S210.

In step S205, the control portion 1 uses the output prohibition information decoding portion 4 to decode the output prohibition information of the embedded information. If the output prohibition information indicates that output is prohibited, the process proceeds to step S207 whereas, if it indicates that the output is not prohibited (that is, is permitted), the process proceeds to step S206.

In step S206, the control portion 1 performs the same processing as in step S106 of FIG. 2. Specifically, the control portion 1 transmits the image information from the memory 7 to the output portion 8 and causes the output portion 8 to print it. Here, the processing performed in steps S106 and S206 is defined as print processing.

In step S207, the control portion 1 does not perform the print processing on the image information, and performs print cancellation processing instead. The print cancellation processing refers to processing for notifying, through the display portion 9, the user of the fact that the print processing is not performed.

In other words, in steps S205 through S207, either the print processing or the print cancellation processing is performed according to the output prohibition information acquired from the image of the scan document.

In step S208, the control portion 1 stores information on the print ID, the user name and the time and date in the current processing in the database 10 as part of the logs. Here, the print ID refers to an ID that is issued by the control portion 1 for the print processing in step S206 or the cancellation processing in step S207 and that is unique to the system. The user name refers to a user name authenticated by the user authentication portion 6; the time and date refers to a time and date when the print processing in step S206 or the cancellation processing in step S207 is performed.

Information as to which of the print processing and the cancellation processing is performed is also stored in the logs. The details of information stored in the logs will be described by way of example with reference to FIG. 7.

In step S209, the control portion 1 stores the image of the scan document stored in the memory 7, as part of the logs, in the database 10 while the image remains a high-resolution image (for example, 600 dpi). The reason why the image is stored as the high-resolution image is that, in step S216, which will be described later, it becomes easier for the information formation portion 3 to acquire the embedded information. Since, as described above, it is necessary to perform the processing for finding the dots in order to acquire the embedded information, if the resolution is low, the embedded information may fail to be acquired. In general, when the resolution is high, the embedded information is more likely to be acquired.

In steps S210 and S211, the control portion 1 performs the same processing as in steps S206 and S208.

In step S212, the control portion 1 converts the image of the scan document stored in the memory 7 into a low-resolution image (for example, 75 dpi), and stores it as part of the logs in the database 10. In other words, the control portion 1 stores the image of the scan document as the log at a resolution that differs according to whether or not the barcode is detected.

In step S213, the control portion 1 determines, with the reading portion 2 or the operation portion 5, whether or not the scanning of all the pages is completed. If it is not completed, the processing between steps S201 and S213 is performed again on the pages that are not scanned whereas, if it is completed, the process proceeds to step S214.

In step S214, the control portion 1 is on standby until the execution of the other jobs in the MFP 3001 is completed. Specifically, the execution of the other jobs refers to the execution of overall output processing that the user requires, through the operation portion 5 (or the PC connected to the MFP 3001), the MFP 3001 to carry out. More specifically, the execution of the other jobs includes copying required by another user and the print processing from a printer driver.

The reason why the control portion 1 is on standby is that, since the following processing (tracking information acquisition processing) from step 215 to step S220 is not required to be performed in real time, and the processing requires a relatively large amount of resource, it is desirable to perform the processing when the resource such as the control portion 1 and the memory 7 is somewhat available. A standby time in step S214 can also be controlled by the control portion 1 based on the order of priority of the jobs in the MFP 3001.

Since, as described above, the tracking information acquisition processing is started after the completion of the execution of the other jobs, it is possible to reduce effects on the other jobs resulting from the consumption of the resource by the tracking information acquisition processing. Since the tracking information acquisition processing is started after the print processing and the print cancellation processing, it is possible to reduce effects on the print processing and the print cancellation processing resulting from the consumption of the resource by the tracking information acquisition processing.

In step S216, the control portion 1 acquires the tracking information from the high-resolution image of the scan document stored as part of the logs in step S209. The acquisition of the tracking information is performed by the information formation portion 3 and the tracking information decoding portion 12.

In step S217, the control portion 1 stores the acquired tracking information in the database 10 as part of the logs.

In step S218, the control portion 1 converts the high-resolution image of the scan document into a low-resolution image in the same manner as in step S212.

In step S219, the control portion 1 performs rewriting on the high-resolution image stored in the database 10 as part of the logs in step S209 with the low-resolution image generated in step S218.

In step S220, the control portion 1 determines whether or not all the high-resolution images stored as part of the logs in step S209 are converted into low-resolution images and the rewriting is completed. If the high-resolution images that have not been converted are left, the processing between step 215 and step S220 is performed again on the high-resolution images whereas, if the high-resolution images are not left, the processing is completed.

Figure 6:
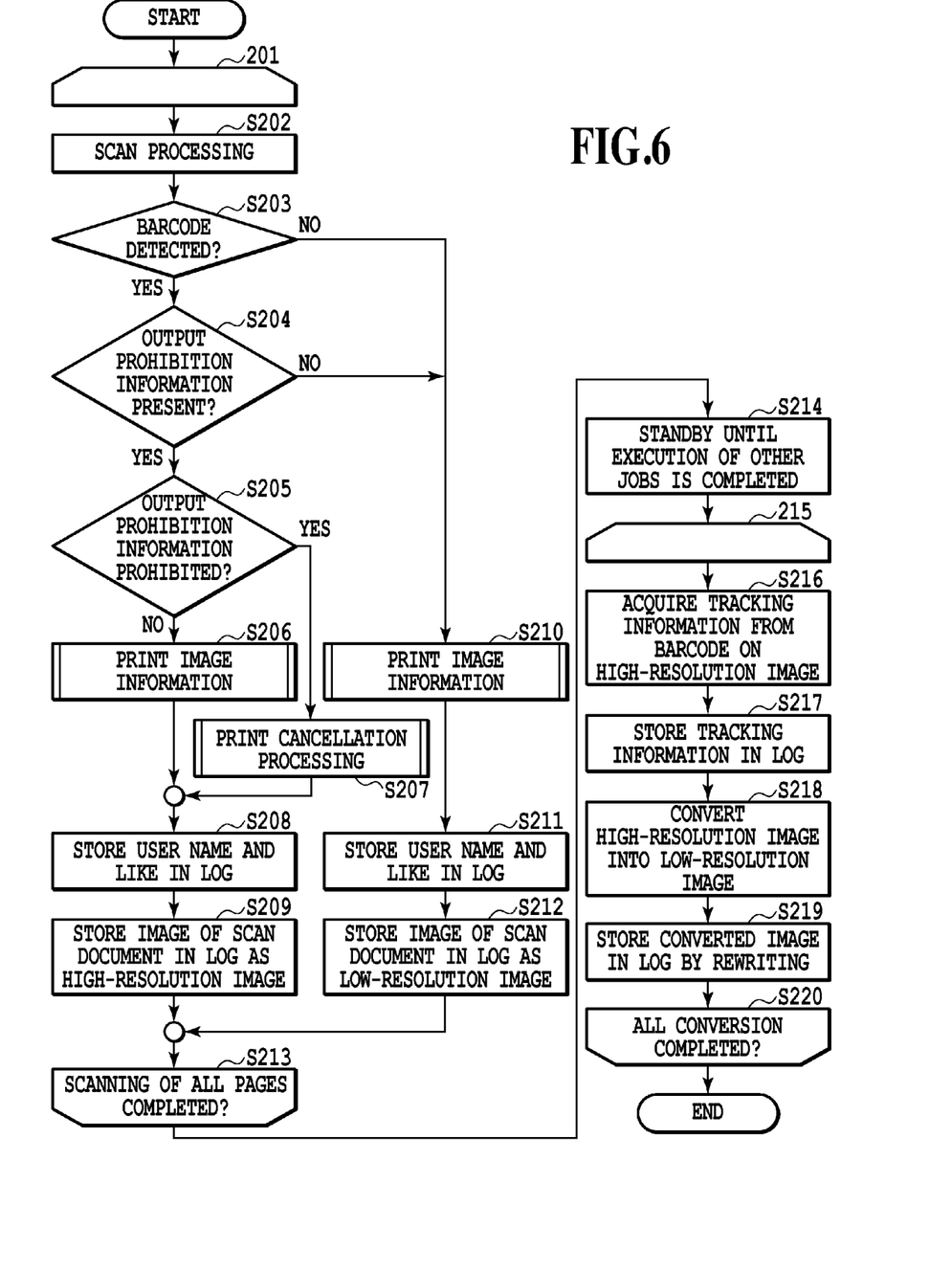
FIG. 6 is a diagram showing an outline of an operation of the MFP of the first example at the time of printing.

When the processing shown in FIG. 6 is performed as described above, the tracking information of the cancellation processing is stored as the log in the database 10. Hence, the organizer of the MFP 3001 can track, even if the print cancellation processing is performed, an evidence of attempt to copy a document which is prohibited from being copied.

Moreover, since the tracking information acquisition processing is started after the completion of the execution of the other jobs, it is possible to reduce effects on the other jobs resulting from the consumption of the resource by the tracking information acquisition processing. Furthermore, since the tracking information acquisition processing is started after the print processing and the print cancellation processing, it is possible to reduce effects on the print processing and the print cancellation processing resulting from the consumption of the resource by the tracking information acquisition processing.

The logs that are stored in the database 10 will now be described with reference to FIG. 7.

In this specification, the logs refer to a collection of history information that the organizer of the MFP 3001 (or the overall system including an external device connected to the MFP 3001) uses to grasp the status of utilization of the MFP 3001 to perform control and tracking.

A log 1010 represents an example of a log that is stored for one round of copying. The numeral 1011 represents an image of the scan document stored in the log. This image is stored by performing the processing in steps S209, S212 and S219 described above, and is normally stored as a low-resolution image so that a burden on the capacity of the database 10 is reduced. The image of the scan document stored in the log is configured by the organizer of the MFP 3001 so that the image can be referenced and searched later.

The numeral 1012 represents the print ID, the user name, an execution time and data and a history as to whether or not a job has been actually performed, information of which is stored in the log. The information here is stored in steps S208 and S211 described above. The organizer of the MFP 3001 can reference and search, with the log 1012, information as to when the job was performed and who executed the job.

The numeral 1013 represents the tracking information that is acquired from the image of the scan document and is stored in the log. This tracking information is stored in step S217 described above only when the barcode is present in the scan document.

Figure 7:
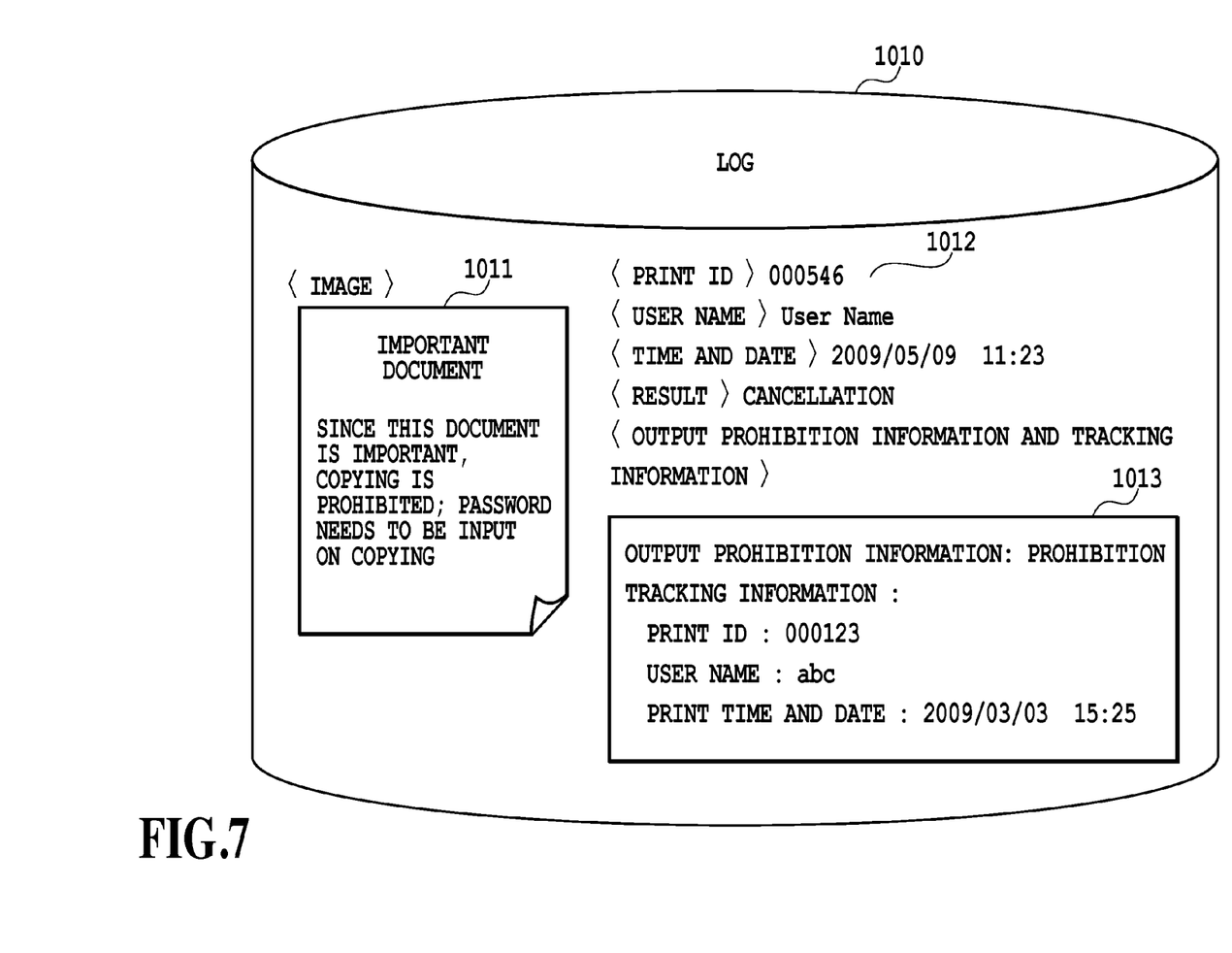
FIG. 7 is a diagram showing an example of a log stored in a database.

In other words, the image information of the scan document, the output prohibition information, information indicating which of the print processing and the cancellation processing is performed and the tracking information are stored (log stored) in association with one another in the log 1010 shown in FIG. 7.

Since, as described above, the tracking information of the scan document is stored as the log, the organizer of the MFP 3001 can track when printing was performed and who performed the printing. Moreover, since the output prohibition information on a print document indicates the prohibition of copying, even if copying processing is cancelled, the tracking information is stored in the log. Thus, it is also possible for the organizer of the MFP 3001 to search an evidence of attempt to copy a specific output prohibition document.

Other Examples

Although, in Example 1, the example is described where the log is stored in the database 10 incorporated in the MFP 3001, the log may be stored in an external device (such as a server) separate from the MFP 3001. In this case, the information formation portion 3 is also provided in the external device, and the processing in steps 215 to 5220 of FIG. 6 is performed in the external device. In this way, it is possible to collectively control logs of a plurality of MFPs with one server.

The information formation portion 3 and the output prohibition information decoding portion 4 of FIG. 1 is considered to be formed with hardware because emphasis is placed on the performance; however, the present invention does not need to be limited to this. The output prohibition information is acquired by hardware, the tracking information is acquired by software and the control of the entire processing is performed by the control portion 1, and thus it is possible to achieve a more efficient embodiment.

In a system where a password authentification is required for the acquisition of the tracking information, when the tracking information is acquired in step S216 of FIG. 6, it is necessary to enter a password. It is preferable to previously register at least one password for the acquisition of the tracking information. The control portion 1 applies the passwords in step S216 to acquire the tracking information, and thereby can perform the processing from step 215 to step S220.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structure and functions.

This application claims the benefit of Japanese Patent Application No. 2009-170083, filed Jul. 21, 2009, which is hereby incorporated by reference herein in its entirety.

What is claimed is:

1. A device comprising:
a receiving unit configured to receive, from a first user, a copy instruction of a document including a code including user information of a second user;
a reading unit configured to read the document to obtain image information;
an acquisition unit configured to acquire information which is included in the code in the image information;
a determination unit configured to determine whether output prohibition information is included in the acquired information; and
a control unit configured to, in a case where it is determined that output prohibition information is not included in the acquired information, output the image information to an output unit, and configured to, in a case where it is determined that output prohibition information is included in the acquired information, not output the image information to the output unit,
wherein the control unit, in the case where it is determined by the determination unit that output prohibition information is not included in the acquired information, stores in a storage unit as a first log, information identifying the first user who has provided the copy instruction of the document and the user information of the second user which is included in the code in the image information, and in the case where it is determined by the determination unit that output prohibition information is included in the acquired information, stores in the storage unit as a second log, information identifying the first user who has provided the copy instruction and the user information of the second user which is included in the code in the image information.

2. The device of claim 1, wherein the control unit stores in the storage unit as the second log, information indicating that the output of the image information is not performed in a case where it is determined by the determination unit that output prohibition information is included in the acquired information.

3. A method executed by a processor of a device, comprising the steps of:
receiving, from a first user, a copy instruction of a document including a code including user information of a second user;
reading the document to obtain image information;
acquiring information which is included in the code in the image information;
determining whether output prohibition information is included in the acquired information;
controlling, in a case where it is determined that output prohibition information is not included in the acquired information, to output the image information to an output unit, and controlling, in a case where it is determined that output prohibition information is included in the acquired information, to not output the image information to the output unit,
wherein the controlling step further comprises, in the case where it is determined that output prohibition information is not included in the acquired information, storing in a storage unit as a first log, information identifying the first user who has provided the copy instruction of the document and the user information of the second user which is included in the code in the image information, and in the case where it is determined that output prohibition information is included in the acquired information, storing in the storage unit as a second log, information identifying the first user who has provided the copy instruction and the user information of the second user which is included in the code in the image information.

4. The method of claim 3, wherein the controlling step further comprises storing in the storage unit as the second log, information indicating that the output of the image information is not performed in a case where it is determined that output prohibition information is included in the acquired information.

5. A non-transitory computer readable storage medium on which is stored computer executable code of a program for causing a computer to perform the method according to claim 3.

* * * * *